(12) United States Patent
Maliszewski et al.

(10) Patent No.: US 9,747,118 B2
(45) Date of Patent: Aug. 29, 2017

(54) GUEST-SPECIFIC MICROCODE

(75) Inventors: Richard L. Maliszewski, Forest Grove, OR (US); James P. Held, Portland, OR (US); Daniel Baumberger, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 1525 days.

(21) Appl. No.: 12/349,307

(22) Filed: Jan. 6, 2009

(65) Prior Publication Data
US 2010/0174889 A1    Jul. 8, 2010

(51) Int. Cl.
*G06F 9/30* (2006.01)
*G06F 9/455* (2006.01)
*G06F 9/22* (2006.01)

(52) U.S. Cl.
CPC ............ *G06F 9/45533* (2013.01); *G06F 9/22* (2013.01); *G06F 9/30174* (2013.01); *G06F 9/30189* (2013.01)

(58) Field of Classification Search
CPC ................... G06F 2009/45587; G06F 9/22
USPC ........................................................ 712/208
See application file for complete search history.

(56) References Cited

U.S. PATENT DOCUMENTS

| 4,787,031 A * | 11/1988 | Karger et al. ............. 718/100 |
| 6,681,322 B1 * | 1/2004 | Safford ............... G06F 9/30036 712/215 |
| 8,024,730 B2 * | 9/2011 | Campbell et al. ......... 718/100 |
| 2007/0028238 A1 * | 2/2007 | Bennett et al. ............ 718/1 |

OTHER PUBLICATIONS

Bauml, Martin. "Hardware virtualization support for Afterburner/L4". 27 Pages. May 4, 2007.*

* cited by examiner

*Primary Examiner* — William B Partridge
(74) *Attorney, Agent, or Firm* — Schwabe, Williamson & Wyatt, P.C.

(57) ABSTRACT

Embodiments of apparatuses, methods, and systems for modifying the behavior of a guest installed to run within a VM are disclosed. In one embodiment, an apparatus includes virtualization logic, first storage, second storage, decode logic, and multiplexing logic. The virtualization logic is to provide a mode in which to operate a virtual machine. The first storage is to store a first plurality of micro-instructions to control the apparatus. The second storage is to store a second plurality of micro-instructions to control the apparatus. The decode logic is to decode a macro-instruction into one of a first plurality and a second plurality of micro-instructions. The multiplexing logic is to cause the macro-instruction to be decoded into the second plurality of micro-instructions instead of the first plurality of micro-instructions only when issued from the virtual machine.

4 Claims, 2 Drawing Sheets

METHOD 200

GUEST-SPECIFIC MICROCODE

BACKGROUND

1. Field

The present disclosure pertains to the field of information processing, and more particularly, to the field of virtualization in information processing systems.

2. Description of Related Art

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A processor in an information processing system may support virtualization, for example, by operating in two modes—a "root" mode in which software runs directly on the hardware, outside of any virtualization environment, and a "non-root" mode in which software runs at its intended privilege level, but within a virtualization environment hosted by a VMM running in root mode. In the virtualization environment, certain events, operations, and situations, such as external interrupts or attempts to access privileged registers or resources, may be intercepted, i.e., cause the processor to exit the virtualization environment so that the VMM may operate, for example, to implement virtualization policies. The processor may support instructions for establishing, entering, exiting, and maintaining a virtualization environment, and may include register bits or other structures that indicate or control virtualization capabilities of the processor.

BRIEF DESCRIPTION OF THE FIGURES

The present invention is illustrated by way of example and not limitation in the accompanying figures.

DETAILED DESCRIPTION

Embodiments of apparatuses, methods, and systems using guest-specific microcode are described. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

It may be desirable to modify the behavior of a guest installed to run within a VM. This may be accomplished by intercepting guest instructions and using a VMM or a different VM to perform or emulate the desired actions. However, the performance of the apparatus may be significantly decreased as the frequency of intercepted events is increased. Therefore, embodiments of the present invention may be used to modify the behavior of a guest installed to run within a VM without frequent interceptions. Embodiments of the present invention may be more desirable than an alternative approach, such as a para-virtualization approach involving special modifications to the guest code.

Figure 1:
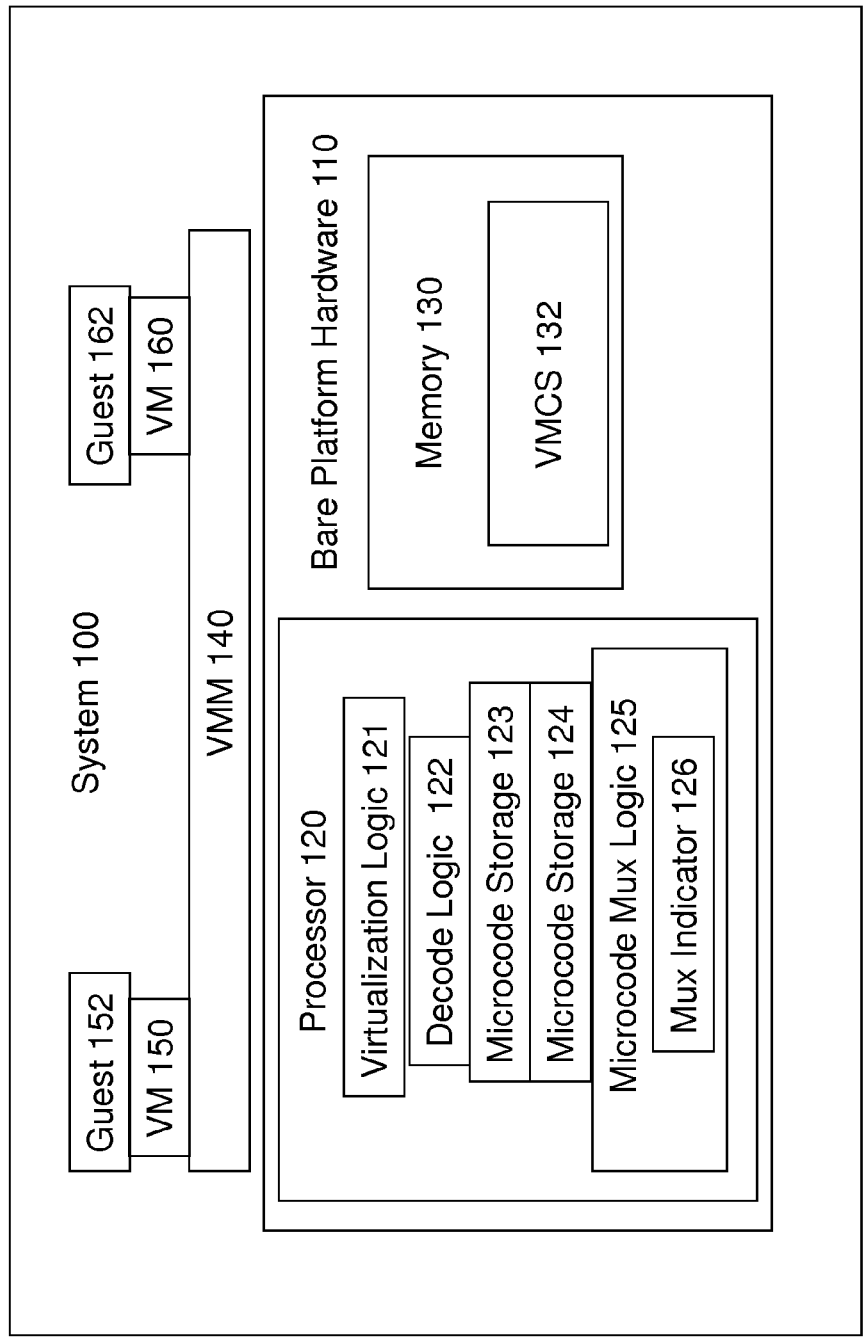
FIG. 1 illustrates an apparatus having guest-specific microcode according to an embodiment of the present invention.

FIG. 1 illustrates information processing system 100, in which an embodiment of the present invention may operate. In FIG. 1, bare platform hardware 110 may be any data processing apparatus capable of executing any OS or VMM software. For example, bare platform hardware may be that of a personal computer, mainframe computer, portable computer, handheld device, set-top box, server, or any other computing system. Bare platform hardware 110 includes processor 120 and memory 130.

Processor 120 may be any type of processor, including a general purpose microprocessor, such as a processor in the Intel® Pentium® Processor Family, Itanium® Processor Family, or other processor family from Intel® Corporation, or another processor from another company, or a digital signal processor or microcontroller. Processor 120 may include multiple threads and multiple execution cores, in any combination. Processor 120 includes virtualization logic 121, decode logic 122, microcode storage 123, microcode storage 124, and microcode multiplexing logic 125. Processor 120 may also include any other circuitry, structures, or logic not shown in FIG. 1. Although FIG. 1 shows only one such processor 120, bare platform hardware 110 may include any number of processors.

Memory 130 may be static or dynamic random access memory, semiconductor-based read only or flash memory, magnetic or optical disk memory, any other type of medium readable by processor 120, or any combination of such mediums.

Processor 120 and memory 130 may be coupled to or communicate with each other according to any known approach, such as directly or indirectly through one or more buses, point-to-point, or other wired or wireless connections. Bare platform hardware 110 may also include any number of additional components or connections.

In addition to bare platform hardware 100, FIG. 1 illustrates VMM 140, VMs 150 and 160, and guests 152 and 162.

VMM 140 may be any software, firmware, or hardware host installed to run on or accessible to bare platform hardware 110, to present VMs, i.e., abstractions of bare platform hardware 110, to guests, or to otherwise create VMs, manage VMs, and implement virtualization policies within virtualization environment 100. In other embodiments, a host may be any VMM, hypervisor, OS, or other software, firmware, or hardware capable of controlling bare platform hardware 110. A guest may be any OS, any VMM, including another instance of VMM 140, any hypervisor, or any application or other software.

Each guest expects to access resources, such as processor and platform registers, memory, and input/output devices, of either bare platform hardware 110 or a platform virtualized by VMM 140, according to the architecture of the processor and the platform presented in the VM. FIG. 1 shows two VMs, 150 and 160, with guest 152 installed to run on VM 150 and guest 162 installed to run on VM 160. Guest 152 and may be any OS or application, and guest 162 may be the same OS or application or a different OS or application. Although FIG. 1 shows two VMs, each with one guest, any number of VMs may be created, and any number of guests may be installed to run on each VM within the scope of the present invention.

A resource that can be accessed by a guest may either be classified as a "privileged" or a "non-privileged" resource. For a privileged resource, VMM 140 facilitates the functionality desired by the guest while retaining ultimate control over the resource. Non-privileged resources do not need to be controlled by VMM 140 and may be accessed directly by a guest.

Furthermore, each guest OS expects to handle various events such as exceptions (e.g., page faults, and general protection faults), interrupts (e.g., hardware interrupts and software interrupts), and platform events (e.g., initialization and system management interrupts). These exceptions, interrupts, and platform events are referred to collectively and individually as "events" herein. Some of these events are "privileged" because they must be handled by VMM 140 to ensure proper operation of VMs 150 and 160, protection of VMM 140 from guests, and protection of guests from each other.

At any given time, processor 120 may be executing instructions from VMM 140 or any guest, thus VMM 140 or the guest may be active and running on, or in control of, processor 120. When a privileged event occurs during guest execution, or a guest attempts to access a privileged resource, control may be transferred from the guest to VMM 140. The transfer of control from a guest to VMM 140 is referred to as a "VM exit" herein. After handling the event or facilitating the access to the resource appropriately, VMM 140 may return control to a guest. The transfer of control from VMM 140 to a guest is referred to as a "VM entry" herein.

In the embodiment of FIG. 1, processor 120 controls the operation of VMs 150 and 160 according to data stored in virtual machine control structure ("VMCS") 132. VMCS 132 is a structure that may contain state of a guest or guests, state of VMM 140, execution control information indicating how VMM 140 is to control operation of a guest or guests, information regarding VM exits and VM entries, any other such information. Processor 120 reads information from VMCS 132 to determine the execution environment of a VM and constrain its behavior. In this embodiment, VMCS 132 is stored in memory 130. VMCS 132 may be divided into multiple structures, each corresponding to one host or one guest, where each may be considered an independent VMCS. Although FIG. 1 shows VMCS 132 stored in memory 130, storing a VMCS in a memory is not required by the present invention.

Returning to processor 120, virtualization logic 121 may include any circuitry, logic, microcode, or other structures to enable, assist, or support a virtualization environment in apparatus 100, including the logic to switch between a root mode, in which a VMM may operate and control bare platform hardware 110, and a non-root mode, in which guests may operate in VMs. Decode logic 122 may include any circuitry, logic, or other structures to decode macro-instructions, such as those issued by a VMM or guest software, into micro-instructions to control processor 120.

Microcode storage 123 may include any form of storage for micro-instructions to control processor 120, such as read-only memory ("ROM"). Microcode storage 124 may include any form of storage for micro-instructions to control processor 120, such as static random access memory ("SRAM"). One or both of microcode storages 123 and 124 may be external to processor 120. Processor 120 may include or have access to any number of additional regions of internal or external microcode storage.

Microcode multiplexing logic 125 may include any circuitry, logic, or other structures to switch the macro-instruction decode path between the micro-instructions stored in microcode storage 123 and the micro-instructions stored in microcode storage 124, or any other regions of microcode storage, either internal or external to processor 120. In one embodiment, microcode multiplexing logic 125 may include control indicator 126, which if set to a first value may cause a macro-instruction to be decoded into a first group of micro-instructions stored in microcode storage 123 for that macro-instruction, and if set to a second value may cause the same micro-instruction to be decoded into a second group of micro-instructions stored in microcode storage 124 for that same macro-instruction.

For some macro-instructions, the group of micro-instructions stored in microcode storage 123 may be the same as that stored in microcode storage 124; however, for other macro-instructions the groups may be different. Therefore, microcode multiplexing logic 125 may be used to cause processor 120 to execute an instruction in at least two different ways. Additionally, microcode multiplexing logic 125 may be used to allow processor 120 to execute an instruction that is not in the instruction set architecture supported by a single region of microcode storage, e.g., the native instruction set architecture of processor 120.

Control indicator 126 may be set by VMM 140 to cause an instruction stream to be executed using microcode storage 124 instead of microcode storage 123 when control is transferred to a VM, for example to one of VM 150 or 160. VMCS 132 may include a microcode multiplex indicator bit or field for each of VM 150 and 160, which may be set by VMM 140. When control is transferred to a VM, the value from the VMCS for that VM is used as the value for control indicator 126. Therefore, VMM 140 may select which of microcode storage 123 or 124 will be used for decoding a guest's instructions. Therefore, the behavior of a guest may be modified without requiring a VM exit for each instruction for which a modification is desired.

Each of virtualization logic 121, decode logic 122, microcode storage 123, microcode storage 124, and microcode multiplex logic 125 may also perform additional functions, including those described as being performed by another of these elements, and any or all of these elements may be integrated into a single element.

Figure 2:
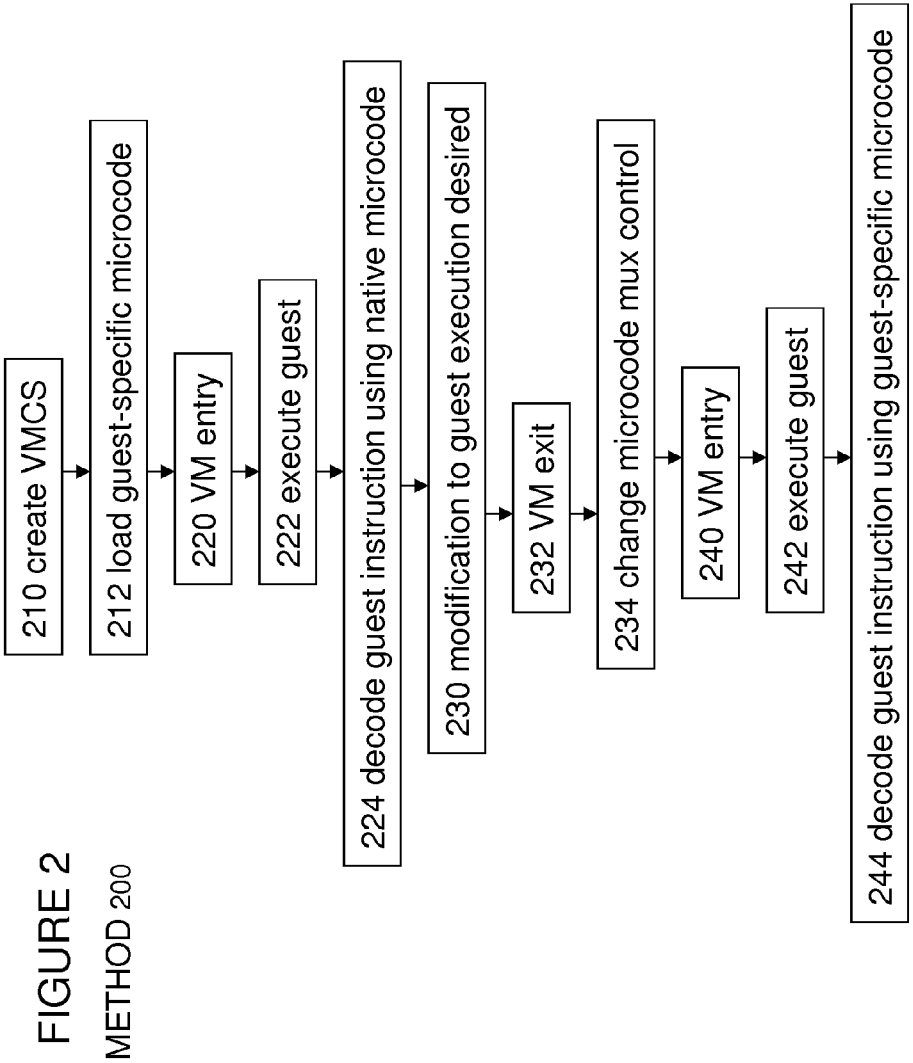
FIG. 2 illustrates a method of using guest-specific microcode according to an embodiment of the present invention.

FIG. 2 illustrates method 200, a method for modifying the behavior of a guest installed to run within a VM according to an embodiment of the present invention. Reference may be made to elements of FIG. 1 to describe the method embodiment of FIG. 2; however, method embodiments of the invention are not limited in this respect.

In box 210 of method 200, VMM 140 creates VMCS 132 for a VM in which to run a guest having guest-specific microcode. In box 212, VMM 140 loads guest-specific microcode, for example from memory 130, into microcode storage 124.

In box 220, a VM entry is performed and control is transferred to the guest. In box 222, the guest begins to run on the VM. By default, macro-instructions being issued by the guest are decoded using microcode storage 123. In box 224, a macro-instruction issued by the guest is decoded to use a first group of micro-instructions, from microcode storage 123, to control processor 120.

In box 230, a modification in the behavior of the guest is desired. The desire for a modification may be based on conditions recognized by the guest, which may make a request for modification, for example, using a software interrupt, or by the VMM, or by another guest in the same or a different VM. In box 232, a VM exit is performed. In box 234, the microcode multiplex indicator is set to decode macro-instructions from microcode storage 124 instead of microcode storage 123.

In box 240, a VM entry is performed and control is transferred to the guest. In box 242, the guest continues to run on the VM. Macro-instructions being issued by the guest are decoded using microcode storage 124 instead of microcode storage 123. In box 244, a macro-instruction, the same macro-instructions issued in box 224, is issued by the guest and decoded to use a second group of micro-instructions, from microcode storage 124 instead of microcode storage 123, to control processor 120.

Within the scope of the present invention, the method illustrated in FIG. 2 may be performed in a different order, with illustrated boxes omitted, with additional boxes added, or with a combination of reordered, omitted, or additional boxes. For example, boxes 220 to 232 may be omitted to allow a guest to begin using guest-specific microcode upon installation.

Processor 120, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, embodiments of apparatuses, methods, and systems for modifying the behavior of a guest installed to run within a VM have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A method comprising:
decoding, by decode circuitry of a processor, a first macro-instruction first issued by a guest of a virtual machine managed by a virtual machine monitor, -into a first group of micro-instructions, using a read-only micro-instruction storage, the read-only micro-instruction storage storing native microcode to support a native instruction set architecture of the processor, wherein the virtual machine including its guest and the virtual machine monitor are all running on the processor, the first macro-instruction is first issued by the guest on transfer of control of the processor to the guest from the virtual machine monitor, after the virtual machine monitor storing guest-specific microcode into a writeable micro-instruction storage;
executing, by the processor, the first group of micro-instructions in response to the first issue of the first macro-instruction to execute the first issue of the first macro-instruction in a first way;
determining, by multiplexing circuitry of the processor based on a multiplexer control indicator, without exiting the virtual machine, that the first macro-instruction from a second issuance by the guest is to be decoded using writeable micro-instruction storage instead of the read-only micro-instruction storage, wherein the multiplexer control indicator is set on detecting a condition indicating that a modification to behavior of the guest is desired; the first macro-instruction is second issued by the guest, on transfer of control of the processor from the virtual machine monitor to the guest, after the multiplexer control indicator is set by the virtual machine monitor to indicate that the first macro-instruction is to be decoded using the writeable micro-instruction storage to allow the processor to execute the first macro-instruction as an instruction not in the native instruction set architecture of the processor, wherein the multiplexer control indicator is set by the virtual machine monitor on detecting a condition indicating that a modification to the behavior of the guest is desired;
decoding, by the decode circuitry, without exiting the virtual machine, the first macro-instruction from the second issuance-, into a second group of micro-instructions different from the first group of micro-instructions, using the guest-specific microcode in the writeable micro-instruction storage; and
executing, by the processor, without exiting the virtual machine, the second group of micro-instructions in response to the first macro-instruction from the second issuance to allow the processor to execute the first macro-instruction from the second issuance, in a second way that is different from the first way.

2. A method comprising:
storing, by a virtual machine monitor running on a processor, guest-specific microcode into a writeable micro-instruction storage;
transferring control of the processor from the virtual machine monitor to a guest running on a virtual machine on the processor, the virtual machine being managed by the virtual machine monitor;

wherein the guest, on receipt of control, first issues a first macro-instruction; a
  decode circuitry of the processor, on first issue of the first macro-instruction, decodes the first macro-instruction using a read-only micro-instruction storage, into a first group of micro-instructions, the read-only micro-instruction storage storing native microcode to support a native instruction set architecture of the processor; and the processor executes the first group of micro-instructions in response to the first issue of the first macro-instruction to execute the first issue of the first macro-instruction in a first way;
detecting a condition indicating that a modification to behavior of the guest is desired;
setting, by the virtual machine monitor, a multiplexer control indicator to indicate that the first macro-instruction is to be decoded using the writeable micro-instruction storage to allow the processor to execute the first macro-instruction as an instruction not in the native instruction set architecture of the processor; and
transferring control of the processor from the virtual machine monitor to the guest running on the virtual machine on the processor;
wherein the guest, on receipt of control, second issues the first macro-instruction;
  multiplexing circuitry of the processor determines based on a multiplexer control indicator, without exiting the virtual machine, that the second issue of the first macro-instruction is to be decoded using writeable micro-instruction storage instead of the read-only micro-instruction storage; the decode circuitry, without exiting the virtual machine, decodes the first macro-instruction using the guest-specific microcode in the writeable micro-instruction storage, into a second group of micro-instructions different from the first group of micro-instructions; and the processor, without exiting the virtual machine, executes the second group of micro-instructions in response to the second issue of the first macro-instruction to allow the processor to execute the second issue of the first macro-instruction in a second way that is different from the first way.

3. A processor comprising:
decode circuitry to decode a first macro-instruction first issued by a guest of a virtual machine managed by a virtual machine monitor, into a first group of micro-instructions, using a read-only micro-instruction storage, the virtual machine including its guest and the virtual machine monitor are running on the processor, the read-only micro-instruction storage storing native microcode to support a native instruction set architecture of the processor, and the first macro-instruction is first issued by the guest on transfer of control of the processor to the guest from the virtual machine monitor, after the virtual machine monitor storing guest-specific microcode into a writeable micro-instruction storage;
an execution unit to execute the first group of micro-instructions in response to the first issue of the first macro-instruction to execute the first issue of the first macro-instruction in a first way; and
multiplexing circuitry to determine based on a multiplexer control indicator, without exiting the virtual machine, that the first macro-instruction from a second issuance by the guest, is to be decoded using writeable micro-instruction storage instead of the read-only micro-instruction storage, wherein the multiplexer control indicator is set on detection of a condition that indicates a modification to behavior of the guest is desired; the first macro-instruction is second issued by the guest, on transfer of control of the processor from the virtual machine monitor to the guest, after the multiplexer control indicator is set by the virtual machine monitor to indicate that the first macro-instruction is to be decoded using the writeable micro-instruction storage to allow the processor to execute the first macro-instruction as an instruction not in the native instruction set architecture of the processor, wherein the multiplexer control indicator is set by the virtual machine monitor on detecting a condition indicating that a modification to the behavior of the guest is desired;
wherein the decode circuitry is to further decode, without exiting the virtual machine, the first macro-instruction from the second issuance, into a second group of micro-instructions different from the first group of micro-instructions, using the guest-specific microcode in the writeable micro-instruction storage; and
wherein the execution unit is to execute, without exiting the virtual machine, the second group of micro-instructions in response to the first macro-instruction from the second issuance to allow the processor to execute the first macro-instruction from the second issuance, in a second way that is different from the first way.

4. An apparatus comprising:
a processor; and
a virtual machine monitor to be operated by the processor to:
store guest-specific microcode into a writeable micro-instruction storage;
transfer control of the processor from the virtual machine monitor to a guest of a virtual machine running on the processor;
wherein the guest, on receipt of control, first issues a first macro-instruction; a
  decode circuitry of the processor, on first issue of the first macro-instruction, decodes the first macro-instruction using a read-only micro-instruction storage, into a first group of micro-instructions, the read-only micro-instruction storage storing native microcode to support a native instruction set architecture of the processor; and the processor executes the first group of micro-instructions in response to the first issue of the first macro-instruction to execute the first issue of the first macro-instruction in a first way;
detect a condition indicating that a modification to behavior of the guest is desired;
set- a multiplexer control indicator to indicate that the first macro-instruction is to be decoded using the writeable micro-instruction storage to allow the processor to execute the first macro-instruction as an instruction not in the native instruction set architecture of the processor; and
transfer control of the processor from the virtual machine monitor to the guest running on the virtual machine on the processor;
wherein the guest, on receipt of control, second issues the first macro-instruction;
  multiplexing circuitry of the processor determines based on a multiplexer control indicator, without exiting the virtual machine, that the second issue of the first macro-instruction is to be decoded using writeable micro-instruction storage instead of the read-only micro-instruction storage; the decode circuitry, without exiting the virtual machine, decodes the first macro-instruction using the guest-specific microcode in the writeable micro-instruction storage, into a second group of micro-instructions different from the first group of micro-instructions; and the processor, without exiting the virtual machine, executes the second group of micro-instructions in response to the second issue of the first macro-instruction to allow the processor to execute the second issue of the first macro-instruction in a second way that is different from the first way.

\* \* \* \* \*

UNITED STATES PATENT AND TRADEMARK OFFICE
CERTIFICATE OF CORRECTION

PATENT NO. : 9,747,118 B2
APPLICATION NO. : 12/349307
DATED : August 29, 2017
INVENTOR(S) : Richard L. Maliszewski It is certified that error appears in the above-identified patent and that said Letters Patent is hereby corrected as shown below:

Claim 1, Column 6:
Line 11, reads "-into," should read -- into --

Claim 1, Column 6:
Line 50, reads "issuance-," should read -- issuance --

Claim 4, Column 8:
Line 52, reads "set-," should read -- set --

Signed and Sealed this
Twelfth Day of June, 2018

Andrei Iancu
*Director of the United States Patent and Trademark Office*